United States Patent [19]

Kubinski et al.

[11] 4,010,058
[45] Mar. 1, 1977

[54] TIRE BUILDING DRUM

[75] Inventors: Donald C. Kubinski, Wadsworth; Robert S. Riggs, Stow, both of Ohio

[73] Assignee: The Goodyear Tire & Rubber Company, Akron, Ohio

[22] Filed: May 16, 1975

[21] Appl. No.: 578,282

[52] U.S. Cl. .............................. 156/415; 156/420
[51] Int. Cl.² ............... B29H 17/16; B29H 17/22
[58] Field of Search .......... 156/132, 133, 398, 400, 156/401, 414–420

[56] References Cited

UNITED STATES PATENTS

| | | | |
|---|---|---|---|
| 2,583,650 | 1/1952 | Hodgkins | 156/420 |
| 2,603,581 | 7/1952 | Ericson et al. | 156/420 |
| 3,160,545 | 12/1964 | Burton | 156/415 |
| 3,536,566 | 10/1970 | Frazier et al. | 156/420 |
| 3,560,301 | 2/1971 | Cantarutti | 156/415 |
| 3,687,779 | 8/1972 | Folden et al. | 156/401 |
| 3,721,600 | 3/1973 | Cantarutti | 156/418 |
| 3,816,218 | 6/1974 | Felten | 156/398 |
| 3,867,231 | 2/1975 | Casey | 156/420 |

*Primary Examiner*—Charles E. Van Horn
*Assistant Examiner*—John E. Kittle
*Attorney, Agent, or Firm*—F. W. Brunner; R. S. Washburn

[57] ABSTRACT

A tire building drum having simple economical means for expanding both drum shoulders and bead-locating fingers as well as for convenient and simple adjustment of the length of the drum between shoulders. Air for inflating pairs of ply-turnup bladders is supplied externally by way of an air ring on the drum shaft from an externally mounted air manifold.

23 Claims, 4 Drawing Figures

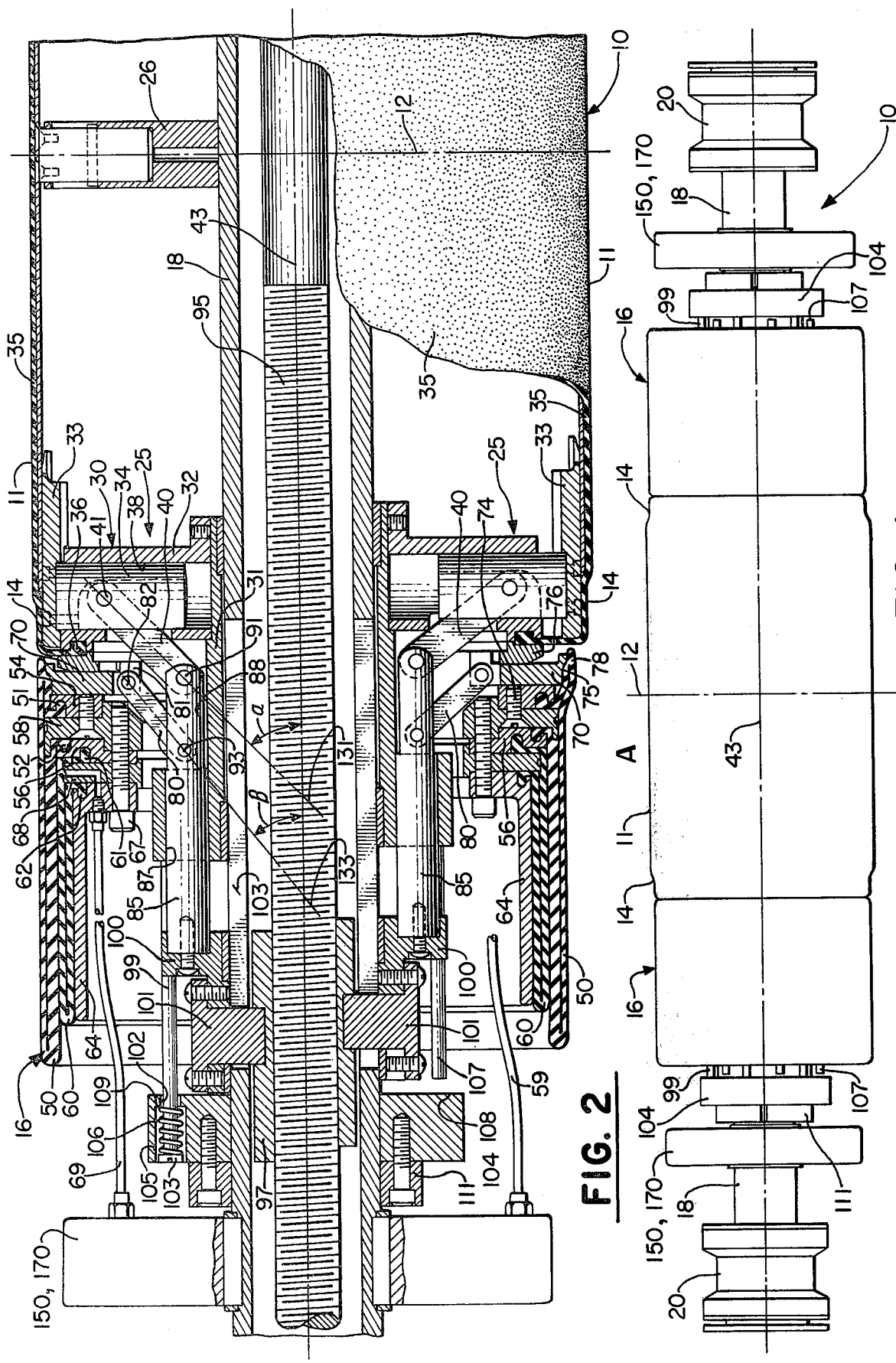

TIRE BUILDING DRUM

The present invention relates to tire building drums.

The object of the invention is an improved tire building drum, embodiments of which are described in the following specification, referring to the accompanying drawings, in which:

FIG. 1 is a longitudinal elevation of a tire building drum in accordance with the invention;

FIG. 2 is an enlarged axial cross-section view of the drum of FIG. 1, shown in its collapsed state in the part of the view above the drum axis and in an expanded state in the part of the view below the drum axis.

Figure 4:
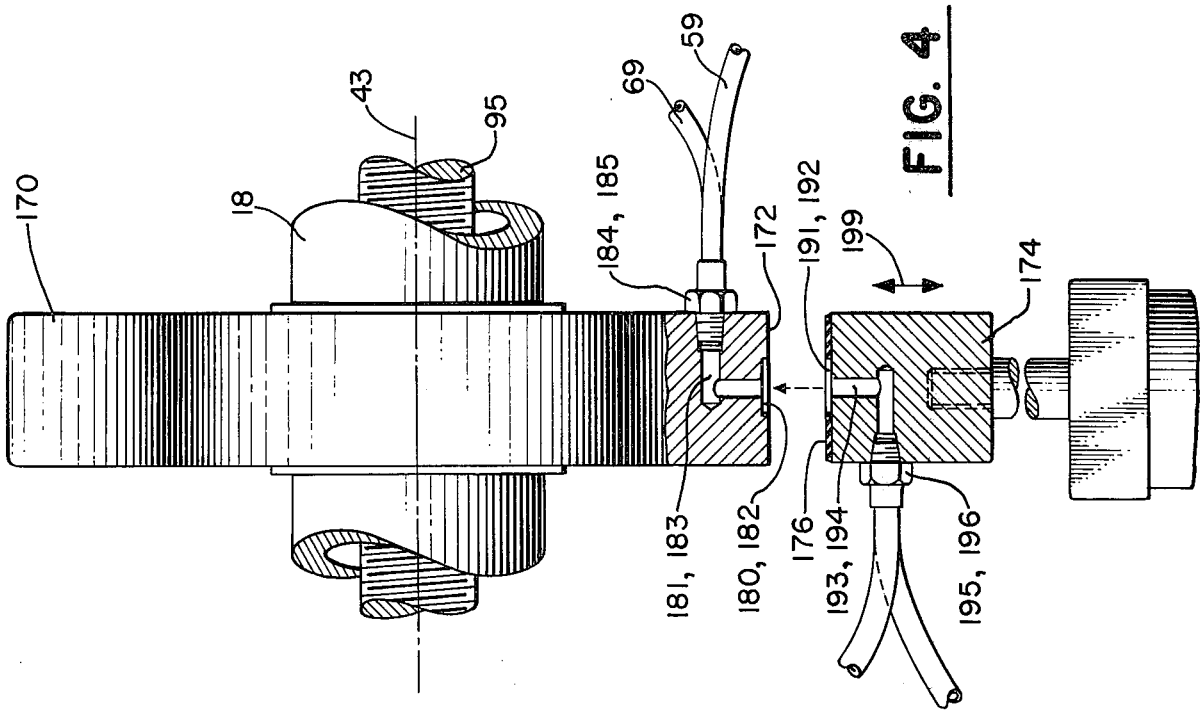
FIGS. 3 and 4 are enlarged views of features of the drum of FIG. 1.

Referring to FIGS. 1 and 2; a tire building drum 10 in accordance with the invention provides a tire building surface 11 of cylindrical form about which a ply or plies and other components can be wrapped. The drum has a central section A disposed symmetrically with respect to the mid-circumferential plane 12 and terminating axially outwardly thereof in the respective shoulder regions 14. Adjacent the respective shoulder regions and extending axially outwardly therefrom are inflatable turnup bladders 16. The drum includes also a center shaft 18 suitably adapted to support the tire building drum rotatably in a tire building machine. In the present embodiment, such support is provided by the bearing housings 20 mounted rotatably at the outward ends of the center shaft.

As best illustrated in FIG. 2, the tire building surface of the drum is supported by a pair of end assemblies 25 and an axially fixed central support 26. In the figure, one such end assembly is illustrated, it being understood that a second end assembly identical and opposite to that shown is disposed axially equidistant of the mid-circumferential plane in the part of the drum which is not shown in the figure. Inasmuch as both end assemblies are identical, the description of one will suffice for both.

The end assembly 25 includes a rigid annular body 30 formed of the flanged sleeve 31 and the cylindrical disc 32 joined thereto. The body 30 is disposed coaxially on the center shaft 18 and is slidable therealong. In the shoulder region 14 a plurality of segments 33 support an elastically expandable center sleeve 35 the end 36 of which is fixed on the disc 32. Each of the segments 33 is fixed on a clyindrical guide 34 each of which slides radially in a bore 38 formed in the body 30. Each of the guides is milled, slotted, or otherwise adapted to accommodate a first link 40 which is pivotally attached to the guide by a pivot pin 41, the radial movement of which, to be explained more fully presently, causes the associated segment to move radially outwardly of the drum axis 43 to expand the building surface 11 and radially inwardly to collapse the building surface 11.

The previously mentioned turnup bladders 16 each include an outer turnup bladder 50 of known construction having its respective annular edges 51, 52 fixed between a first ring 54 and a second ring 56. Between the respective edges 51, 52 is a throat ring 58 having an annular air groove and a passage connecting the groove with a conventional tube fitting and externally mounted flexible air tube 59. A second or inner turnup bladder 60, of known construction, has its respective annular edges 61, 62 secured between the ring 56 and a cylindrical auxiliary drum 64 which extends axially outwardly to provide support for the turnup bladders. Between the respective annular edges 61, 62, a second throat ring 68 is similarly provided with a groove and a passage connecting the groove to a second externally mounted flexible air tube 69. The bolts 67 (shown rotated from true location) secure the auxiliary drum 64 and the rings 68, 56, 58, and 54, to the body 30, thus forming a rigid integral unit with the body.

A plurality of radially movable fingers 70 which cooperate to position a tire bead are disposed slidably in a plurality of radial slots 72 formed between the annular rings 54, 76 and are guided thereby for movement radially of the drum axis. The ring 76 is clamped by the bolts 74 (shown rotated from true location) between the slots to the rings 54 and 58. The radially outward surfaces 75 of the respective fingers cooperate to support a nose portion 78 of the outer turnup bladder 50 which extends close to the shoulder region 14. The radially inner end of each of the fingers is slotted as at 81 to accommodate the radially outer end of a second link 80 which is pivotally attached to the respective finger 70 by a pin 82.

In accordance with the invention, means for actuating the segments 33 and the fingers 70 include a plurality of slides 85 which extend parallel to the drum axis and are slidably accommodated in bores 87 formed in the flanged sleeve 31. The axially inward end 88 of each slide is bifurcated in the manner of a conventional clevis to accommodate the respective radially inner ends of the first 40 and the second 80 links for pivotal movement about the respective pins 91, 93, each slide 85 being associated with one of the segments 33 and with one of the fingers 70.

A screw shaft 95, which is disposed coaxially in the center shaft 18, cooperates with a nut 97 which is slidable longitudinally within the center shaft, it being understood that the threads of the screw and of the cooperating nut are of opposite lead in the two portions of the drum such that rotation of the screw shaft can provide equal and opposite movement of the respective nuts.

An actuating member 100 mounted slidably on the center shaft 18 is attached to the nut 97 by keys 101 which extend through the respective longitudinal slots 103 formed in diametrically opposite walls of the center shaft in such a manner that the operating member 100 is moved longitudinally of the center shaft in concert with the associated nut.

Each slide 85 is rigidly affixed to the operating member 100 to move longitudinally of the shaft in fixed relation with the movement of the nut 97. Movement of the nut and the respective slides toward the mid-circumferential plane 12 of the drum causes the radially inner ends of the first 40 and second 80 links to move parallel to the axis of the drum. The radially outer ends of the respective links, being pivotally connected respectively to the guide 34 and to the finger 70 compel the radial expansion of the segments 33 and of the fingers 70 in timed relation with each other. Movement of the nut 97 axially away from the plane 12 operates to retract the segments and the fingers radially toward the axis.

To provide control of the formation of a bead receiving shoulder as well as for adjustment of the width of the drum between shoulders, the end assembly 25 is connected by the rods 99 to a shaft collar 104. The tie rods are fixed in the flanged sleeve 31, extend axially freely through openings in the operating member 100 and holes 102 in the collar. Enlarged heads 103 of the tie rods are disposed in the counterbores 105. Stop rods 107, also fixed in the sleeve 31, extend axially freely through openings in the member 100 and abut the axially inner surface 108 of the collar 104. Between the seat 109 of the counterbore and the head 103 of the tie-rod is a spring 106 of selected length and spring rate which serves to urge the end assembly outward toward the associated shaft collar, as well as to inhibit slack between the fingers, segments, and the screw shaft. The axial movement of the end assembly 25 along the center shaft during operation is thus limited to the compression of the springs 106 selected. The shaft collar 104 is secured to a split ring clamp 111 which, for adjustment of the drum length, is released and reclamped after the collar 104 and assembly 25 have been relocated.

Motion control means according to the invention provides combined radial and axial movement of the segments 33 during expansion of the shoulders 14 of the drum, and comprises in combination the tie-rods 99, the springs 106, and the collar 104 by which the assembly 25 is connected to the center shaft for limited and resilient movement axially. This movement is induced by the axial movement of the slides 85 in response to rotation of the screw shaft 95 while the links 40 move the segments 33 radially in response to the movement of the slides. The arrangement tends to compensate for the change in length of a carcass ply on the central section A and on the uninflated turnup bladders 16 during expansion and assist formation of a regular shoulder in the ply where the tire bead is placed.

It will be observed that the first link 40 is relatively longer than the second link 80 as measured between the respective pivot pins (41–91, 82–93) and that a line 131 defined by the respective pivot pins of the first link makes an angle alpha with the drum axis 43 which is greater than the angle beta formed by a line 133 defined by the centers of the respective pivot pins of the second link 80 with the drum axis. This arrangement provides that the segments 33 are caused to rise radially farther than are the fingers 70. This difference provides a shoulder of suitable radial height adjacent a tire bead core which is positioned adjacent to the shoulder by the fingers.

Figure 3:
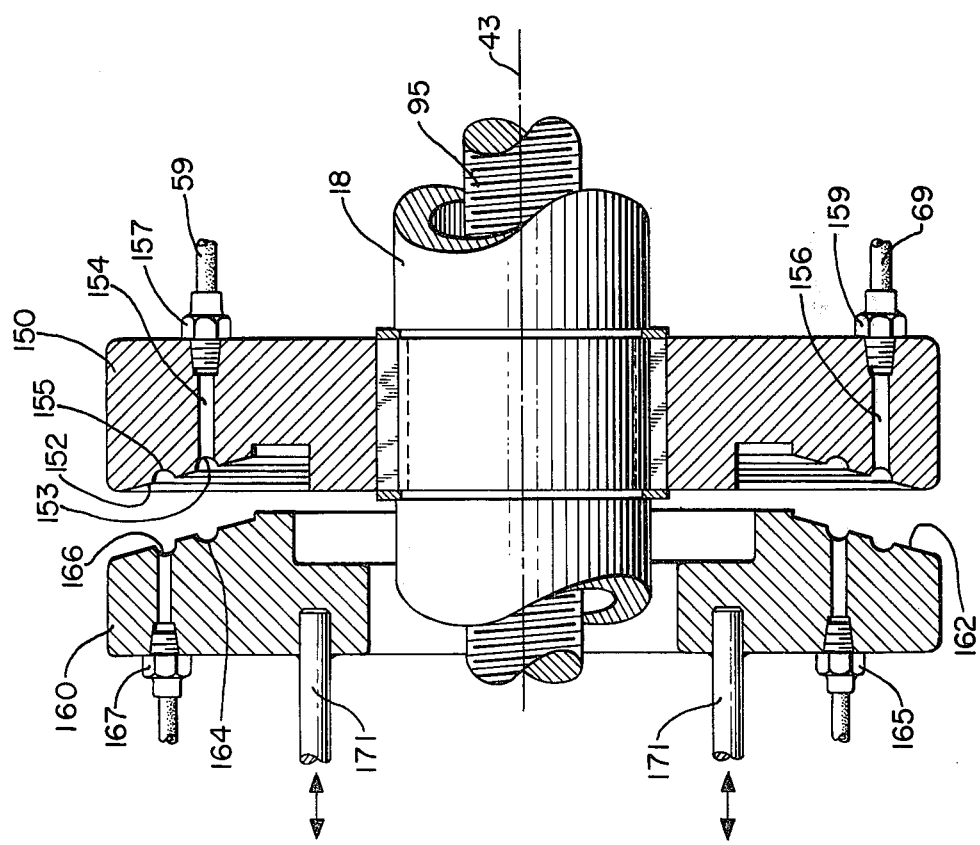

In accordance with a further aspect of the invention, air pressure connection means, referring to FIGS. 3 and 4, is provided in the form of an air connection ring 150 which provides for communicating controlled pressure air to and from the turnup bladders which connections are entirely external to the center shaft 18 and can be completely disconnected and reconnected easily and quickly. The ring 150 is mounted corotatably on the center shaft 18 axially outward of the associated end assembly 25. The air connection ring 150 has a sealing engagement surface which is a conical surface 152 coaxial with the drum, and has a plurality of annular grooves 153, 155 sunk in the conical surface, each communicating respectively with an air passage 154, 156 through the ring which passages each open to a conventional fitting 157, 159. A flexible tube 59, 69 is connected at one end to the respective fitting 157, 159 and at its other end to a similar conventional fitting (not visible in the figure) in the end assembly 25. The respective fittings on the end assembly communicate with the throat ring 68 serving the radially inner turnup bladder 60 and with the throat ring 58 serving the radially outer turnup bladder 50.

An air supply manifold 160 is supplied with a conjugate sealing engagement surface 162 having annular grooves 164, 166 corresponding to the grooves 153, 155 in the air connection ring. Each groove 164, 166 is connected to an internal passage terminating respectively in a fitting 165, 167 to which an air supply tube is connected from a source (not shown) of controlled air pressure. The manifold 160 can be moved to a position in which the sealing engagement surfaces 152, 162 are held in air pressure sealing relation and the respective grooves 154–164 and 155–166 are in air flow communication. The manifold is provided with support rods 171 slidably mounted in the building machine and is connected to means (not shown) for moving the manifold 160 to engage the surfaces 152–162 as described and away axially to a remote position. The arrangement provides for rapid accurate connection and disconnection of controlled air pressure to a tire building drum without the necessity for expensive rotary joint connections or internal passageways within the drum center shaft. In a second and preferred embodiment of the air connection means, the air connection ring 170 has sealing engagement surface 172 which is a plane surface parallel to the drum axis and to a diameter of the connection ring 170. The air supply manifold 174 is similarly provided with a plane surface 176. In the surface 172, grooves 180 and 182 communicate with passages 181, 183 which connect with fittings 184, 185. The previously described flexible tubes 59, 69 are connected for air flow respectively to the fittings. In the surface 176 of the manifold 174 are corresponding grooves 191, 192 which connect by way of passages 193, 194 in the manifold 174 to the fittings 195, 196 to which are connected supply tubes from a controlled air pressure supply (not shown). Means for moving the manifold from its first position in air transfer relation with the air connection ring move in this embodiment in a direction normal to the drum axis as is indicated by the arrow 199.

A tire building drum in accordance with the invention is simple to construct and is low in cost relative to heretofore available drums. It provides what is sometimes referred to as a negative crown, meaning that the carcass ply is first wrapped to form a cylinder of less diameter than the inner diameter of the beads to be applied. The turnup bladders provide fully for turning ply endings about the beads, requiring no auxiliary equipment external to the drum itself, other than controlled pressure air. The latter, according to the invention, is supplied by way of the air ring connection without expensive and intrically machined passages within the drum structure. The drum is particularly useful in an automated multi-drum tire building machine.

While certain representative embodiments and details have been shown for the purpose of illustrating the invention, it will be apparent to those skilled in the art that various changes and modifications may be made therein without departing from the spirit or scope of the invention.

What is claimed is:

1. A tire building drum including a shaft and a pair of drum end assemblies each having a plurality of segments disposed about the shaft which cooperate to form shoulders of the drum, and a plurality of bead positioning fingers disposed about the shaft adjacent to and axially outward of the shoulders which cooperate to position the tire bead, a righthand-lefthand screw disposed coaxially of the shaft, a nut disposed within the shaft adjacent to each end assembly, each nut being cooperable with a respective threaded portion of said screw to move axially of the shaft in response to rotation of the screw and characterized by means for actuating the segments and the fingers of the drum comprising a plurality of slides rigidly connected to each nut and disposed slidably in the respective end assemblies for movement parallel to the shaft, a first rigid link associated with each said slide and pivotally connected at its respective ends to one of said segments and to the associated slide, and a second rigid link associated with each said slide and pivotally connected at its respective ends to one of said fingers and to the associated slide.

2. A tire building drum as claimed in claim 1, further comprising a plurality of inflatable turnup bladders disposed coaxially of said shaft and respectively outwardly from said shoulders and overlying the radially outer ends of said fingers.

3. Apparatus as claimed in claim 2, further characterized by means for adjusting axially the length of said drum between said shoulders including a shaft collar releasably secured on said shaft and a plurality of tie-rods fixed to the respective end assembly and connected to said collar to permit limited movement of the end assembly with respect to said collar.

4. Tire building drum as claimed in claim 2, further characterized by air connection means for communicating controlled pressure air to and from said turnup bladders comprising an air connection ring fixed corotatably on the shaft and axially outwardly of the associated end assembly and having a first engagement surface, an air supply manifold having a second engagement surface and mounted for movement between a first position wherein the first and second engagement surfaces are in air pressure transfer relation and a second position wherein said manifold is disposed apart from said ring.

5. A tire buidling drum as claimed in claim 1, further characterized in that each said first link is greater in length, from pivoted end to pivoted end thereof than the respectively associated second link.

6. A tire building drum as claimed in claim 1, further characterized in that the angle between a line defined by the pivoted ends of said first link and the axis of the drum is greater than the angle between a line defined by the pivoted ends of said second link and the axis of the drum, both angles being referred to the collapsed position of the drum.

7. A tire building drum including a center shaft and a pair of drum end assemblies each having a plurality of segments disposed about the center shaft which cooperate to form shoulders of the drum and a plurality of bead positioning fingers disposed about the center shaft adjacent to and axially outwardly of the shoulders which cooperate to position a tire bead, means mounted slidably on said center shaft and cooperable with respective said assemblies to actuate said segments, and characterized by means for adjustably fixing the axial length of said drum between said shoulders, said means for fixing comprising a shaft collar adjustably fixed on said shaft adjacent each said end assembly, and a plurality of tie-rods fixed to the respective end assembly and connected to said shaft collar and bridging said means for actuating said segments disposed therebetween.

8. Tire building drum as claimed in claim 7, further comprising a plurality of inflatable turnup bladders disposed coaxially of said shaft and respectively outwardly from said shoulders and overlying the radially outer ends of said fingers.

9. Tire building drum as claimed in claim 8, further characterized by means for actuating the segments and the fingers in predetermined timed relation.

10. Tire building drum as claimed in claim 8, further characterized by air connection means for communicating controlled pressure air to and from said turnup bladders comprising an air connection ring fixed corotatably on the shaft and axially outwardly of the associated end assembly and having a first engagement surface, an air supply manifold having a second engagement surface and mounted for movement between a first position wherein the first and second engagement surfaces are in air pressure transfer relation and a second position wherein said manifold is disposed apart from said ring.

11. A tire building drum including a center shaft and a pair of drum end assemblies each having a plurality of segments disposed about the center shaft which cooperate to form shoulders of the drum and a plurality of bead positioning fingers disposed about the center shaft adjacent to and axially outward of the shoulders and which cooperate to position a tire bead, ply turnup means including an inflatable outer turnup bladder and an inflatable inner turnup bladder disposed coaxially of the drum and outwardly from the respective shoulder thereof and characterized by air connection means for communicating controlled pressure air to and from the inner and the outer bladder disposed externally of said center shaft and comprising an air connection ring mounted corotatably on the shaft axially outwardly of the associated end assembly and having a first sealing engagement surface and having a plurality of air flow passages therein each opening in said surface, an air supply manifold having a second sealing engagement surface and having a plurality of air flow passages each opening in said second surface, said manifold being mounted for movement between a first position wherein the first and the second sealing engagement surface are in air pressure transfer engagement and a second position wherein said manifold is disposed apart from said ring, and a plurality of flexible tubes disposed radially outwardly of said shaft connecting respective passages with said inner and said outer bladder.

12. Tire building drum as claimed in claim 11, further comprising a plurality of inflatable turnup bladders disposed coaxially of said shaft and respectively outwardly from said shoulders and overlying the radially outer ends of said fingers.

13. Tire building drum as claimed in claim 12, further characterized by means for actuating the segments and the fingers in predetermined timed relation.

14. Tire building drum as claimed in claim 12, further comprising motion control means constructed and arranged to connect each said end assembly respectively to said shaft to permit limited relative axial movement of said end assemblies in a predetermined range during the radial movement of said segments.

15. A tire building drum as claimed in claim 11, further characterized in that said first sealing engagement surface is a plane surface disposed parallel to said drum axis and to a diameter of said ring.

16. A tire building drum as claimed in claim 11, further characterized in that said first sealing engagement surface is a conical surface and said passages each include an annular groove open to said conical surface.

17. A tire building drum including a shaft and a pair of drum end assemblies mounted slidably on the shaft each having a plurality of segments disposed about the shaft which cooperate to form shoulders of the drum and a plurality of bead positioning fingers diposed about the shaft adjacent to and axially outward of the shoulders which cooperate to position a tire bead, a righthand-lefthand screw disposed coaxially in the shaft, a nut disposed within the shaft and axially adjacent to each end assembly, each nut being cooperable with a respective threaded portion of said screw shaft to move axially of the shaft to move said segments and said fingers radially in response to rotation of the screw, and motion control means constructed and arranged to interconnect said end assemblies respectively to said shaft to limit relative axial movement of said assemblies in a predetermined range.

18. Tire building drum as claimed in claim 17, further comprising a plurality of inflatable turnup bladders disposed coaxially of said shaft and respectively outwardly from said shoulders and overlying the radially outer ends of said fingers.

19. Tire building drum as claimed in claim 18, further characterized by means for actuating the segments and the fingers in predetermined timed relation.

20. Apparatus as claimed in claim 19, further characterized by means for adjusting axially the length of said drum between said shoulders including a shaft collar releasably secured on said shaft and a plurality of tie-rods fixed to the respective end assembly and connected to said collar to permit limited movement of the end assembly with respect to said collar.

21. Tire building drum as claimed in claim 19, further characterized by air connection means for communicating controlled pressure air to and from said turnup bladders comprising an air connection ring fixed corotatably on the shaft and axially outwardly of the associated end assembly and having a first engagement surface, an air supply manifold having a second engagement surface and mounted for movement between a first position wherein the first and second engagement surfaces are in air pressure transfer relation and a second position wherein said manifold is disposed apart from said ring.

22. A tire building apparatus as claimed in claim 17, said motion control means including spring means biasing said end assemblies axially outwardly with respect to the mid-plane of the drum.

23. A tire building apparatus as claimed in claim 22, including a shaft collar adjustably fixed on said shaft, a plurality of tie-rods fixed in said end assembly and having enlarged heads disposed to engage said shaft collar, and a plurality of stop rods fixed in said end assembly and engageable with said collar, whereby axial movement of said end assembly relative to the associated stop collar in an axially inward direction is limited by said tie-rod heads and in an axially outward direction of said stop rods.

* * * * *